United States Patent

[11] 3,624,317

[72] Inventors Richard Morgan Buckingham
Temple Hills;
Robert Edward Michell, Jr., Lanham, both of Md.
[21] Appl. No. 89,940
[22] Filed Nov. 16, 1970
[45] Patented Nov. 30, 1971
[73] Assignee Mico Development Company, Inc.
Bladensburg, Md.

[54] TELEPHONE LOCK
11 Claims, 5 Drawing Figs.

[52] U.S. Cl. .......... 179/189 R, 70/DIG. 72, 179/189 D
[51] Int. Cl. .......... E05b 73/00, H04m 1/66
[50] Field of Search .......... 70/14, 57, 58, DIG. 57, DIG. 72; 179/189 R, 189 D

[56] References Cited

UNITED STATES PATENTS

| | | | |
|---|---|---|---|
| 2,683,778 | 7/1954 | Gilmore | 179/189 D |
| 2,841,658 | 7/1958 | Dawkins | 179/189 D |
| 3,469,041 | 9/1969 | Winston | 179/189 |
| 3,495,050 | 2/1970 | Bart | 179/189 |

*Primary Examiner*—Robert L. Wolfe
*Attorney*—Griffin, Branigan & Kindness

ABSTRACT: A device for locking a telephone to prevent the unauthorized use thereof is described. The device comprises a baseplate that clamps to the web located between the handset cradles of a convention desk-style telephone base. In one form, a locking plate having a pair of outwardly extending wings is used in combination with the baseplate. The wings extend outwardly to cover the switch pins located in the handset cradles. The locking plate supports a cylinder lock, the cylinder of which passes through an aperture in the baseplate. Located on the lower end of the cylinder lock is a cam. When the cylinder lock is rotated, the cam engages the lower surface of the baseplate and locks the locking plate against vertical movement. This action prevents the switch pins from raising upwardly. In a second form, the locking plate hooks under the lower front corner of the telephone and covers the pushbuttons or dial to prevent access thereto. The other end of this locking plate also includes a cylinder lock and cam that engages the baseplate to prevent the removal thereof.

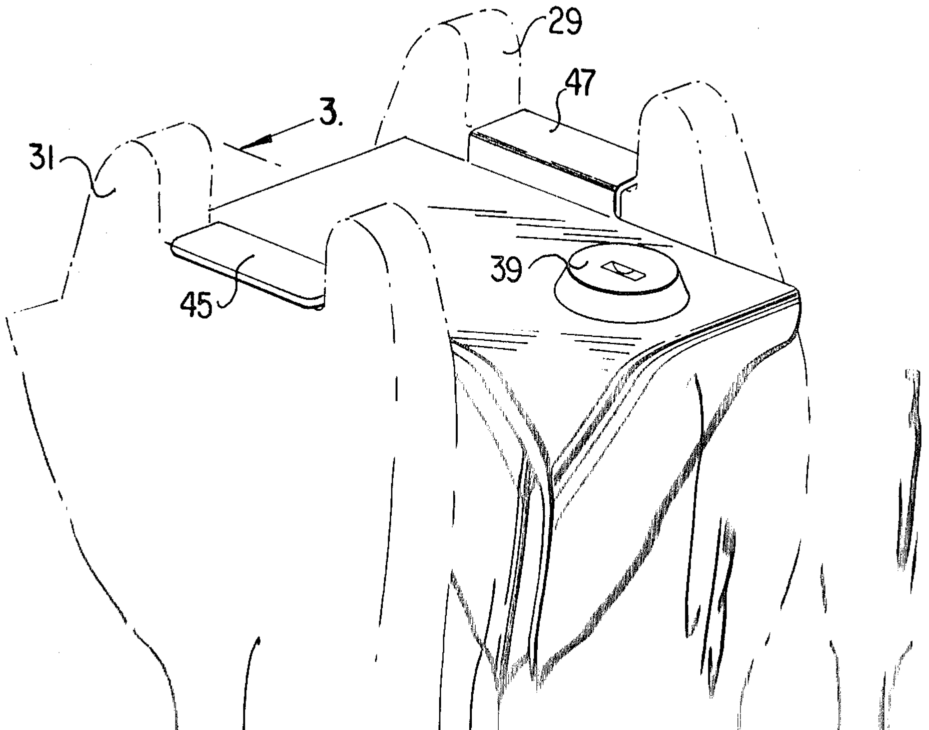

TELEPHONE LOCK

BACKGROUND OF THE INVENTION

This invention is directed to locking devices and more particularly, to a telephone lock that prevents the unauthorized use of the telephone.

Various types of telephone locking devices have been proposed and are in use. Probably the most common device is attached to the telephone dial by insertion into one of the fingerholes formed therein. While somewhat effective, this device has the disadvantage that it is easily circumvented by bending the dial finger stop so that the dial can be rotated. Furthermore, this type of telephone lock cannot be used with pushbutton telephones.

An alternate, and commonly used device for locking a telephone, locks the handset so that it cannot be lifted from the cradles of the telephone. While these types of devices provide more positive locking than the dial locks, they also have certain disadvantages. For example, these devices are often clumsy to use and difficult to remove from the telephone when it is desired to use the telephone. Furthermore, because many of these devices fill the handhole carrying space located beneath the web formed between the cradles, they prevent the telephone from being easily transported. Moreover, handset locking devices are inherently aesthetically unpleasing.

Still another telephone lock, such as that disclosed in U.S. Pat. No.2,641,659 to Benson, lock the switch pins located in the cradle of the telephone in the down position to prevent use of the telephone. While these devices overcome some of the problems of the previously discussed devices, they have not been entirely satisfactory. One reason that they are unsatisfactory is that they lack a positive locking action. For example, the device described in the foregoing patent utilizes the rib of the web located between the cradles in combination with a cam on the end of a cylinder lock. However, it has been found that web and rib thickness vary, whereby this type of locking device cannot form a positive lock force on all telephones. This type of locking device is also unsatisfactory because it is easily bent or sprung in a manner that allows the cam to be withdrawn from behind the rib.

Therefore, it is an object of this invention to provide a new and improved telephone lock.

It is a further object of this invention to provide a telephone lock that is positively clamped to the telephone to prevent the easy removal thereof without the use of mechanical tools.

It is a further object of this invention to provide a telephone lock that is useful with pushbutton as well as dial telephones.

It is a still further object of this invention to provide a telephone lock for a desk-style telephone that does not interfere with the handle carrying feature built into such a telephone.

SUMMARY OF THE INVENTION

In accordance with principles of this invention, a telephone lock is provided. The telephone lock comprises a baseplate that is positively clamped to the web located between the cradles of a conventional desk-type telephone. A locking plate, adapted to prevent the use of the telephone, is attached to the baseplate by a cylinder lock having a cam located on its interior end. More specifically, the cylinder lock is affixed to the locking plate and passes through an aperture in the baseplate. When a key is rotated in the cylinder lock, the cam coacts with the baseplate to prevent the locking plate from being removed.

In accordance with further principles of this invention, the locking plate is generally rectangular in shape and includes a pair of outwardly projecting wings. The wings fit over the switch pins that project upwardly from the cradle. When the locking plate is locked in place, the wings prevent the switch pins from raising which prevents use of the telephone. The locking device is formed of a relatively lightweight material so that when the cam is rotated to an unlocked position, the locking plate raises under the pressure of the switch pin.

Hence, the locking plate does not have to be removed to allow use of the telephone, it merely has to be unlocked.

In accordance with alternate principles of this invention, the locking plate comprises a cover plate that is hook shaped in cross section. The hook portion hooks under the lower front edge of the telephone. The cover plate passes over the dial or pushbuttons and has affixed thereto a cylinder lock that passes through the aperture in the baseplate. The cylinder lock includes a cam that interacts with the baseplate to lock the cover plate in position. Hence, the cover plate embodiment prevents access to the dial or the pushbuttons to prevent use of the telephone, rather than maintaining the switch pins in an inoperative position.

In accordance with further principles of this invention, the baseplate is formed of two pieces which are bolted together in a clamp manner. The heads of the bolts lie under the locking plate to prevent removal thereof. In addition, the baseplate includes a notch through which the rib of the web passes. Further, shims or compressible members are used with the baseplate to compensate for web thickness variations.

It will be appreciated from the foregoing brief summary of the invention that a device for locking a telephone is provided. The locking device overcomes many of the structural disadvantages of the prior art devices by utilizing a baseplate that is positively clamped to the web of the telephone. In addition, the invention is versatile in that it can be used with either dial or pushbutton-type telephones. Further, the invention does not prevent use of the handle carrying feature built into conventional telephones.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a pictorial diagram illustrating one embodiment of the invention;

FIG. 2 is a pictorial diagram illustrating the embodiment of the invention illustrated in FIG. 1 mounted on a telephone;

FIG. 3 is a cross-sectional view along line 3—3 of FIG. 2;

FIG. 4 is a pictorial diagram illustrating an alternate embodiment of the invention mounted on a telephone; and, FIG. 5 is a side view of a telephone having the embodiment of the invention illustrated in FIG. 4 mounted thereon.

DESCRIPTION OF THE PREFERRED EMBODIMENTS

FIG. 1 illustrates a preferred embodiment of the invention which comprises a baseplate 11 and a locking plate 13. The baseplate 11 is formed of a relatively thick lower plate 15 and a relatively thin upper plate 17, both of which are generally rectangular. The lower plate 15 is undercut along one edge to provide a plateau 19. Between the plateau 19 and the remainder of the lower plate 15 is a notch 21 which is parallel to the plateau 19. Mounted on the plateau 19 is a compressible sheet 23 which may be rubber or neoprene, for example.

The upper plate 17 is generally flat and is bolted to the lower plate by a pair of slotted bolts 25. The bolts 25 are countersunk into the upper plate 17 so as to be flat with the upper surface of the upper plate when the upper plate is attached to the lower plate in the indicated sandwich manner. It will be appreciated from the foregoing description that the baseplate is generally "C-shaped "in cross section. The internal region thusly formed fits over the web of the telephone in the manner hereinafter described.

A generally oval aperture 27 is cut through the upper and lower plates 17 on the opposite side thereof from the plateau 19. Preferably, the upper and lower plates are formed of a suitable metal material, such as aluminum or a magnesium compound. Alternatively, they may be formed of a suitable plastic material.

locks said locking plate with respect to said baseplate when said cylindrical lock is operated by said key.

2. A telephone locking device as claimed in claim 1 wherein said baseplate comprises:

a lower plate, said lower plate being undercut along one edge to form a plateau, said plateau lying below the surface of said plate in which it is formed, said lower plate also including a notch arrayed parallel to said plateau and separating said plateau from the remainder of the surface in which said plateau is formed; and, an upper plate adapted to be attached to said lower plate in a sandwich manner; and, at least one bolt that projects from said upper plate into said lower plate to lock said upper plate to said lower plate.

3. A telephone locking device as claimed in claim 2 including means for varying the height of said plateau, said means for varying the height of said plateau being mounted on said plateau.

4. A telephone locking device as claimed in claim 3 wherein said means for varying the height of said plateau is compressible.

5. A telephone locking device as claimed in claim 4 wherein said locking plate includes at least one wing adapted to fit into at least one of the cradles of said base so as to prevent at least one of the switch pins of said base from raising when said locking plate is locked to said baseplate through the operation of said cylindrical lock.

6. A telephone locking device as claimed in claim 5 wherein said locking plate includes two wings that project outwardly in opposite directions so as to prevent the switch pins located in the cradles of said base from raising when said locking plate is locked to said baseplate through the operation of said cylindrical lock.

7. A telephone locking device as claimed in claim 4 wherein said locking plate conforms to the face of said telephone and includes a hook-shaped end adapted to hook under the lower front edge of the telephone, said locking plate passing over the operative element of said telephone to prevent the use thereof and being locked to said baseplate by said cylindrical lock.

8. A telephone locking device as claimed in claim 1 wherein said locking plate includes two wings that project outwardly in opposite directions so as to prevent the switch pins located in the cradles of said base from raising when said locking plate is locked to said baseplate through the operation of said cylindrical lock.

9. A telephone locking device as claimed in claim 8 wherein said baseplate comprises:

a lower plate, said lower plate being undercut along one edge to form a plateau, said plateau lying below the surface of said plate in which it is formed, said lower plate also including a notch arrayed parallel to said plateau and separating said plateau from the remainder of the surface in which said plateau is formed; and, an upper plate adapted to be attached to said lower plate in a sandwich manner; and, at least one bolt that projects from said upper plate into said lower plate to lock said upper plate to said lower plate.

10. A telephone locking device as claimed in claim 1 wherein said locking plate conforms to the face of said telephone and includes a hook-shaped end adapted to hook under the lower front edge of the telephone, said locking plate passing over the operative element of said telephone to prevent the use thereof and being locked to said baseplate by said cylindrical lock.

11. A telephone locking device as claimed in claim 10 wherein said baseplate comprises:

a lower plate, said lower plate being undercut along one edge to form a plateau, said plateau lying below the surface of said plate in which it is formed, said lower plate also including a notch arrayed parallel to said plateau and separating said plateau from the remainder of the surface in which said plateau is formed; and, an upper plate adapted to be attached to said lower plate in a sandwich manner; and, at least one bolt that projects from said upper plate into said lower plate to lock said upper plate to said lower plate.

* * * * *

United States Patent

[11] 3,624,318

[72] Inventor Karl Rekers
4441 Spelle Kreis Lingen, Germany
[21] Appl. No. 783,787
[22] Filed Dec. 16, 1968
[45] Patented Nov. 30, 1971
[32] Priorities Dec. 27, 1967
[33] Germany
[31] P 16 15 547.8;
May 27, 1968, Germany, No. P 17 65 482.9

[54] CURRENT SUPPLY ARRANGEMENTS FOR MOBILE LOAD DEVICES
30 Claims, 21 Drawing Figs.

[52] U.S. Cl. .......... 191/23 A, 174/70 C, 191/35, 191/45 A, 339/22
[51] Int. Cl. .......... B60m 1/34
[50] Field of Search .......... 174/70.3; 339/21, 23, 22 T; 191/35, 22, 23 A

[56] References Cited
UNITED STATES PATENTS
2,530,354 11/1950 Hayslett .......... 339/176 M X
2,970,286 1/1961 Modrey .......... 339/21 X
FOREIGN PATENTS
699,098 10/1953 Great Britain .......... 191/35

*Primary Examiner*—Arthur L. La Point
*Assistant Examiner*—George H. Libman
*Attorney*—Arthur O. Klein

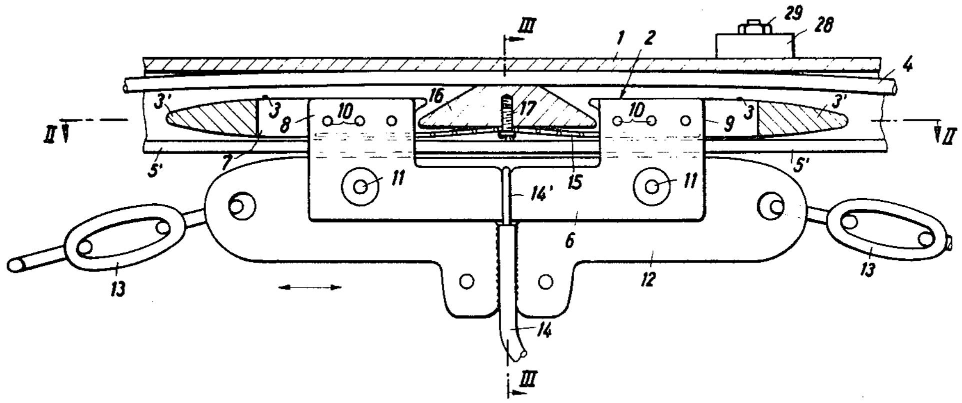

ABSTRACT: A current supply arrangement for a mobile load device consists of an elongate, flexible, stringlike member of hollow-sectioned profile forming a collection line duct accommodating a flexible conductor of corresponding length and forming a single current supply pole, and a current pickup device comprising a slide carried by the collector line duct and guided in a slot therein, the slide being connected with the load device for traction thereby. A plurality of these single current supply poles are strung in side-by-side parallel relation along a required route to form a multipole current supply unit.